United States Patent [19]  [11] 3,879,391
Diskus et al.  [45] Apr. 22, 1975

[54] PHENYLPYRIDAZINES AND THE PREPARATION THEREOF
[75] Inventors: Alfred Diskus, Linz/Donau; Rupert Schönbeck, Leonding near Linz/Donau; Engelbert Kloimstein, Eferding; Hubert Mayr, Leonding near Linz/Donau, all of Austria
[73] Assignee: Osterreichische Stickstoffwerke Aktiengesellschaft, Linz/Donau, Austria
[22] Filed: May 21, 1973
[21] Appl. No.: 362,505

[52] U.S. Cl.................. 260/250 A; 71/92; 424/250
[51] Int. Cl............................................. C07d 51/04
[58] Field of Search............................... 260/250 A

[56] References Cited
FOREIGN PATENTS OR APPLICATIONS
2,129,109   1/1973   Germany .......................... 260/250 A Primary Examiner—Alton D. Rollins
Assistant Examiner—D. B. Springer
Attorney, Agent, or Firm—Wenderoth, Lind & Ponack

[57] ABSTRACT
New phenylpyridazines of the general formula:

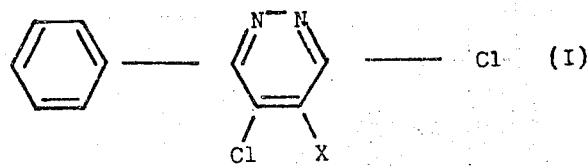

in which
X is a group of the formula

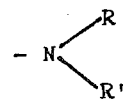

or — O — R″, wherein
R and R′ are the same or different and each is a hydrogen atom or an alkyl group having 1, 2 or 3 carbon atoms and
R″ is a hydrogen atom or an alkyl group having 1 to 6 carbon atoms. These compounds have valuable herbicidal properties coupled with good toleration by crops plants.

11 Claims, No Drawings

PHENYLPYRIDAZINES AND THE PREPARATION THEREOF

This invention relates to phenylpyridazines and the preparation thereof. The invention is also concerned with herbicidal compositions containing such compounds.

It has already been known for some time that pyridazine derivatives can influence the growth of plants (see Austrian Patent Specification No. 198,997). Austrian Patent Specification 237,962 discloses 3,6-dichloro-4-hydroxy-pyridazine as a selective agent for combating weeds. This compound was manufactured by partial saponification of 3,4,6-trichloropyridazine. 3,4,6-Trichloro-5-alkoxy-pyridazines, which also possess valuable herbicidal properties, may be prepared, according to Austrian Patent Specification No. 285,618, by the reaction of 3,4,5,6-tetrachloropyridazine with alkali alcoholates.

It has now been found that phenyl-pyridazines of the general formula

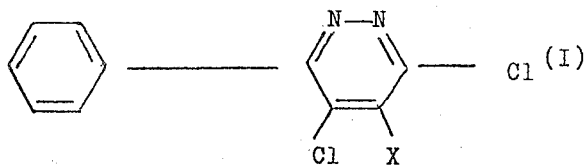

in which
X is a group of the formula

or O — R'',
wherein
each of R and R', which may be the same or different, is a hydrogen atom or an alkyl group containing 1,2 or 3 carbon atoms, and
R'' is a hydrogen atom or an alkyl group containing 1 to 6 carbon atoms, possess valuable herbicidal properties coupled with good toleration by crop plants and rapid commencement of action.

The present invention provides compounds of the general formula I and also a process for the preparation of a compound of formula I, which comprises reacting 3-phenyl-4,5,6-trichloropyridazine, in solution, with an amine of the general formula HNRR', in which R and R' are as defined above, or with a compound of the general formula MOR'', in which M is an alkali metal or alkaline earth metal and R'' is as defined above.

The present invention further provides a herbicidal composition for the selective combating of weeds in crop plantings, which comprises, as the active substance, one or more compounds of the formula I herein by themselves or admixed with one or more solid and/or liquid inert extenders or diluents and/or wetting agents, and, optionally, insecticides, growth regulators and/or plant nutrients.

The preparation of the compounds according to the invention may be carried out in aqueous solution or, in the case of the reaction with the alcoholate, in alcoholic solution, using as the solvent the appropriate alcohol which forms the alcoholate.

In the starting substance 3-phenyl-4,5,6-trichloropyridazine all three chlorine atoms appear to be equivalent unless it is assumed that the phenyl group in the 3-position renders the chlorine atom in the 4-position mobile. In contrast thereto, it was found that the three possible substitution products are not produced alongside one another and also the substitution does not take place in the 4-position, and instead the chlorine atom in position 5 is preferantially replaced under mild experimental conditions. In the case of the reaction with amine, only a very slight excess of the amine and mild reaction conditions are employed. To neutralise the hydrochloric acid liberated at the same time, an acid-binding agent, for example a tertiary amine, preferably may be added, or a further mol of the amine NHRR' may be employed for this purpose. Stoichiometric amounts suffice for the reaction with alcoholates or alkali metal hydroxides or alkaline earth metal hydroxides.

Under certain conditions it may be more advantageous to follow an indirect method for the manufacture of the compounds according to the invention which contain a hydroxyl group in position 5, by first preparing the alkoxy compound from the trichloro compound by reaction with an alcoholate and then converting the alkoxy compound into the hydroxy compound by alkaline ether splitting, namely by boiling with an aqueous caustic alkali solution.

The 3-phenyl-4,5,6-trichloropyridazine employed as the starting material is also new and forms colourless crystals of melting point 121° to 122°C. It may be manufactured from the known 3-phenyl-4,5-dichloropyridazone-(6) (Dury-Angew.Chemie year 77 (1965) No. 7, page 284) by means of phosphorus oxychloride.

The compounds obtained according to the invention are either colourless crystalline compounds or oily liquids. They may be isolated in a simple manner from the reaction mixture by separating off the crystals, which are in most cases sparingly soluble, and recrystallising them from organic solvents. Where oily compounds are concerned, these may be isolated from the reaction mixture by means of a solvent, for example an ether.

Some of the compounds according to the invention are weakly acid in character (3-phenyl-4,6-dichloro-5-hydroxy-pyridazine) while others are weakly basic in character (for example the compounds substituted by an amino group in position 5), and still others are neutral (the ether compounds). Corresondingly, some of the compounds show a certain solubility in acids or alkalis. In general, however, this group of compounds is only very sparingly soluble in water.

The active compounds according to the invention are compounds which are taken up by the leaves of the weeds and the action thereof is therefore independent both of the nature of the soil and of the soil humidity. Since these compounds do not act in the sense of growth substances, the danger of damage to adjoining crops by drift of a mist of active substance is very substantially reduced.

The herbicidal compositions according to the invention may be in the form of dispersions or emulsions, in the form of a pulverulent preparation or in the form of granules. Of course, admixture with other herbicidal active substances is also possible, and a conjoint application with insecticides, growth regulators or plant nutrients has also proved of value. For compositions in the form of aqueous dispersions or emulsions it is advisable to add a dispersing agent such as, for exmaple, sodium oleyl-methyltauride. Possible solid extenders are, inter alia, different varieties of clay, for example kaolin.

It is advantageous to mix the compounds according to the invention with a non-phytotoxic oil, for example a mineral oil-emulsifier consisting of a paraffinic mineral oil and an emulsifier. The herbicidal action may be further increased by adding such a "spray oil" to a spraying solution of the compound according to the invention. Such mixtures usually contain 1 to 10 kg. of the active compound according to the present invention and 1 to 10 litres of a non-phytotoxic oil, distributed in an amount of water of 50 to 1,000 litres.

The Examples which follow illustrate the preparation of the compounds according to the invention, and the use thereof in herbicidal compositions.

EXAMPLE 1

50 g of 3-phenyl-4,5,6-trichloropyridazine and 300 ml. of concentrated aqueous ammonia solution were heated to 100°C. for 5 hours in a rotary autoclave, and cooled, and the crystals were filtered off and recrystallised from ethanol.

Yield: 32 g, corresponding to 69.0% of theory, of 3-phenyl-4,6-dichloro-5-amino-pyridazine.

Melting point: 195° – 200°C, with slight decomposition.

C calc: 50.02%; H calc.: 2.94%; N calc.: 17.50%; Cl calc.: 29.54%.

C found: 50.4%; H found: 2.8%; N found: 17.5%; Cl found: 29.6%.

EXAMPLE 2

50 g of 3-phenyl-4,5,6-trichloropyridazine were suspended in 200 ml of ethanol, 100 ml of 40% strength aqueous methylamine solution were added and the mixture was warmed to 60°–70°C for 3 hours. Thereafter it was evaporated in vacuo, the residue was stirred with water and the crystals were filtered off and recrystallised from ethanol.

Yield: 37 g, corresponding to 75.5% of theory, of 3-phenyl-4,6-dichloro-5-monomethylaminopyridazine.

Melting point: 145° – 146°C.

C calc.: 51.99%; H calc.: 3.57%; N calc.: 16.54%; Cl calc.: 27.91%.

C found: 51.8%; H found: 3.6%; N found: 16.2%; Cl found: 28.1%.

EXAMPLE 3

50 g of 3-phenyl-4,5,6-trichloropyridazine were mixed with 100 ml of 60% strength aqueous dimethylamine solution and the mixture was stirred for 2 hours at 40° to 50°C. It was then cooled and the crystals were filtered off, washed with water, dried and recrystallised from diisopropyl ether.

Yield: 35 g corresponding to 67.8% of theory, of 3-phenyl-4,6-dichloro-5-dimethylamino-pyridazine.

Melting point: 106°–109°C.

C calc.: 53.75%; H calc.: 4.13%; N calc.: 15.67%; Cl calc.: 26.45%. C found: 53.4%; H found: 4.2%; N found: 15.6%; Cl found: 26.3%.

EXAMPLE 4

10 g of 3-phenyl-4,5,6-trichloropyridazine, 30 ml of ethanol and 10 ml of 50% strength aqueous monoethylamine solution were mixed and warmed for 4 hours to 60°–70°C, the mixture was then evaporated in vacuo, the residue was stirred with water and the oil which solidified was filtered off and recrystallised from diisopropyl ether.

Yield: 6.3 g, corresponding to 60.5% of theory, of 3-phenyl-4,6-dichloro-5-ethylamino-pyridazine.

Melting point: 85°–87°C.

C calc.: 53.75%; H calc.: 4.13%; N calc.: 15.67%; Cl calc.: 26.45%.

C found: 53.9%; H found: 4.2%; N found: 15.7%; Cl cound: 26.2%.

EXAMPLE 5

10 g of 3-phenyl-4,5,6-trichloropyridazine were mixed with 30 ml of ethanol and 6 g of diethylamine, the mixture was then boiled for 3 hours under a reflux condenser and evaporated in vacuo, the residue was extracted with benzene, the benzene was evaporated off and viscous oil was obtained as the residue.

Yield: 7.0 g, corresponding to 61.2% of theory, of 3-phenyl-4,6-dichloro-5-diethylamino-pyridazine.

C calc.: 56.77%; H calc.: 5.11%; N calc.: 14.18%; Cl calc.: 23.94%.

C found: 56.0%; H found: 4.8%; N found: 13.8%; Cl found: 23.8%.

EXAMPLE 6

10 g of 3-phenyl-4,5,6-trichloropyridazine, 30 ml of ethyl alcohol and 5 g of isopropylamine were mixed and the mixture was boiled for 3 hours under a reflux condenser and evaporated in vacuo.

The residue was stirred with water, the oily product was extracted with benzene, and the benzene solution was dried with $Na_2SO_4$, treated with decolourising charcoal and evaporated. A viscous oil remained.

Yield: 9.0 g, corresponding to 82.7% of theory, of 3-phenyl-4,6-dichloro-5-isopropylamino-pyridazine.

C calc.: 55.34%; H calc.: 4.64%; N calc.: 14.89%; Cl calc.: 25.13%.

C found: 55.9%; H found: 4.6%; N found: 14.7%; Cl found: 25.0%.

EXAMPLE 7

10 g of 3-phenyl-4,5,6-trichloropyridazine, 100 ml of water and 3.0 g of NaOH were mixed and boiled for 1.5 hours under a reflux condenser, with vigorous stirring. After about 1 hour, a clear solution had been produced. This was cooled and filtered, the filtrate was acidified and the crystals which precipitated were filtered off, washed with water and recrystallised from ethanol.

Yield: 8.0 g, corresponding to 86% of theory, of 3-phenyl-4,6-dichloro-5-hydroxypyridazine.

Melting point: From 294°–300°C onwards, with decomposition.

C Calc.: 49.82%; H calc.: 2.51%; N calc.: 11.62%; Cl calc.: 29.42%; O calc.: 6.63%.

C found: 49.7%; H found: 2.6%; N found: 11.5%; Cl found: 29.2%; O found: 6.7%.

EXAMPLE 8

1.0 g of sodium was dissolved in 20 ml of methanol and the solution was added dropwise, at room temperature, to a mixture of 10 g of 3-phenyl-4,5,6-trichloropyridazine and 30 ml of methanol. The batch was then boiled for 30 minutes under a reflux condenser, filtered and evaporated in vacuo, the residue was stirred with water and the crystals were filtered off and recrystallised from diisopropyl ether.

Yield 6.9 g, corresponding to 70% of theory, of 3-phenyl-4,6-dichloro-5-methoxy-pyridazine.

Melting point: 84°–85°C.

C calc.: 51.79%; H calc.: 3.16%; N calc.: 10.98%; Cl calc.: 27.80%; O calc.: 6.27%.

C found: 52.0%; H found: 3.1%; N found: 11.1%; Cl found: 27.6%; O found: 6.4%.

EXAMPLE 9

0.7 g of sodium was dissolved in 20 ml of absolute ethanol and the solution was added dropwise, at room temperature, to a mixture of 9 g of 3-phenyl-4,5,6-trichloropyridazine and 30 ml of absolute ethanol. The batch was then boiled for 30 minutes under a reflux condenser and evaporated in vacuo, the residue was mixed with water, the oily product was extracted with chloroform, the chloroform was evaporated off and the residue was distilled in vacuo.

Yield 6.7 g, corresponding to 71.7% of theory, of 3-phenyl-4,6-dichloro-5-ethoxy-pyridazine.

Boiling point$_{0.05}$: 163° – 166°C.

C calc.: 53.55%; H calc.: 3.64%; N calc.: 10.41%; Cl Calc.: 26.35%; O calc.: 5.95%.

C found: 53.2%; H found: 3.4%; N found: 10.2%; Cl found: 26.5%; O found: 5.7%.

EXAMPLE 10

10 g of 3-phenyl-4,6-dichloro-5-methoxypyridazine were suspended in 100 ml of water, the suspension was heated to the boil, a solution of 1.7 g of NaOH in 10 ml of water was added dropwise over the course of 1 hour and the mixture was boiled for a further hour. A clear solution was thereby produced. After cooling, the mixture was acidified with dilute hydrochloric acid and the crystals were filtered off, washed with water and dried.

Yield: 9.2 g, corresponding to 97% of theory, of 3-phenyl-4,6-dichloro-5-hydroxy-pyridazine.

Melting point: 296° – 299°C, with decomposition.

This compound is identical with that obtained in Example 7.

EXAMPLE 11

25.9 g of 3-phenyl-4,5,6-trichloropyridazine were dissolved in 100 ml of n-butanol, a solution of 2.3 g of sodium in 100 ml of n-butanol was added at 60°C, the mixture was boiled for 1 hour under a reflux condenser and evaporated in vacuo, the residue was extracted with 100 ml of diisopropyl ether, the extract was filtered and evaporated and the residue was distilled in vacuo.

Yield: 19.3 g, corresponding to 65% of theory, of 3-phenyl-4,6-dichloro-5-n-butoxy-pyridazine.

Boiling point$_{0.05}$ = 165° – 168°C.

EXAMPLE 12

20 parts of 3-phenyl-4,6-dichloro-5-hydroxypyridazine, 75 parts of kaolin or powdered clay and 5 parts of sodium oleyl-methyl-tauride were mixed in a mechanical grinding and mixing device and ground until a homogeneous dust of the desired particle size was obtained. The spray liquor obtained by stirring the formulation into an appropriate amount of water was applied to the plants by spraying.

EXAMPLE 13

20 parts of 3-phenyl-4,6-dichloro-5-ethoxypyridazine, 70 parts of xylene and 10 parts of alkylarylsulphonate mixed with polyoxyethylene-sorbitane-tall oil ester were mixed. The emulsion concentrate thereby obtained gave a stable emulsion by stirring into the amount of water required for application to the plant.

Formulations of the following composition were produced similarly:

50% of 3-phenyl-4,6-dichloro-5-aminopyridazine
10 % of ligninsulphonate
35% of kaolin
5% of sodium oleyl-methyl-tauride 70% of 3-phenyl-4,6-dichloro-5-hydroxypyridazine
10% of ligninsulphonate
15% of kaolin or powdered clay
5% of sodium oleyl-methyl-tauride 20% of 3-phenyl-4,6-dichloro-5n-butoxy-pyridazine
70% of xylene
10% of alkylarylsulphonate mixed with polyoxyethylene-sorbitane-tall oil ester.

EXAMPLE 14

The following weeds grown in a greenhouse:

| | |
|---|---|
| Erodium cicutarium | Stork's bill |
| Centaurea jacea | Meadow knapweed |
| Lapsana communis | Nipplewort |
| Galium aparine | Cleavers |
| Matricaria chamomilla | Camomile |
| Lamium purpureum | Deadnettle |
| Veronica hederaefolia | Speedwell |
| Galeopsis tetrahit | Hemp-nettle | were sprayed with a suspension of the compounds according to the invention after the weeds had reached the 4–6 leaf stage. The spraying solution was prepared by suspending a wettable powder consisting in each case of 20% by weight of the active substance in question, 70% by weight of kaolin and 10% by weight of the dispersing agent sodium oleyl-methyl-tauride. To manufacture an emulsion concentrate, 20% by weight of the active substance were dissolved in 70% by weight of xylene and 10% by weight of an emulsifier (alkylarylsulphonate mixed with polyoxyethylene-sorbitane-tall oil ester) were added. The dosage corresponded to 5.0 kg and 1.4 kg of the active compound per hectare. 14 days after the treatment, the herbicidal effect on the weeds was determined in accordance with the E.W.R.C. rating scheme (E.W.R.C.= European Weed Research Council). The ratings 1 to 9 correspond to the following proportions of destruction:

| Rating of the Herbicidal Action | Corresponding to % Destruction of the Weeds |
|---|---|
| 1 | 100 |
| 2 | 97.5 |
| 3 | 95 |
| 4 | 90 |
| 5 | 85 |
| 6 | 75 |
| 7 | 65 |
| 8 | 32.5 |
| 9 | 0 |

Herbicidal action on various weeds

| Weeds: | Erodium cicutarium | | Centaurea jacea | | Lapsana communis | | Galium aparine | | Matricaria chamomilla | | Lamium purpureum | | Veronica hederaefol | | Galeopsis tetrahit | |
|---|---|---|---|---|---|---|---|---|---|---|---|---|---|---|---|---|
| Active compounds X in the formula I | 1.4 | 5 | 1.4 | 5 | 1.4 | 5 | 1.4 | 5 | 1.4 | 5 | 1.4 | 5 | 1.4 | 5 | 1.4 | 5 kg/ha |
| $NH_2$ | 1 | 1 | 1 | 1 | 2 | 1 | 3 | 1 | 1 | 1 | 1 | 1 | 1 | 1 | 1 | 1 |
| $NHCH_3$ | 1 | 1 | 1 | 1 | 3 | 1 | 3 | 1 | 1 | 1 | 1 | 1 | 1 | 1 | 1 | 1 |
| $N(CH_3)_2$ | 1 | 1 | 1 | 1 | 1 | 1 | 2 | 1 | 1 | 1 | 1 | 1 | 1 | 1 | 1 | 1 |
| $NHC_2H_5$ | 1 | 1 | 3 | 1 | 5 | 1 | 3 | 2 | 1 | 1 | 1 | 1 | 1 | 1 | 1 | 1 |
| $N(C_2H_5)_2$ | 1 | 1 | 3 | 1 | 3 | 1 | 5 | 2 | 3 | 2 | 5 | 3 | 3 | 2 | 2 | 1 |
| $NH-C_3H_7$—iso | 5 | 1 | 8 | 1 | 7 | 5 | 5 | 4 | 4 | 2 | 6 | 3 | 3 | 2 | 3 | 2 |
| OH | 1 | 1 | 1 | 1 | 1 | 1 | 1 | 1 | 1 | 1 | 1 | 1 | 1 | 1 | 1 | 1 |
| $OCH_3$ | 9 | 2 | 8 | 1 | 8 | 1 | 7 | 2 | 1 | 1 | 2 | 1 | 2 | 1 | 3 | 1 |
| $OC_2H_5$ | 3 | 1 | 1 | 1 | 7 | 1 | 6 | 1 | 1 | 1 | 2 | 1 | 3 | 1 | 2 | 1 |
| $OC_4H_9$—n | 3 | 1 | 1 | 1 | 7 | 1 | 9 | 6 | 3 | 2 | 2 | 2 | 3 | 2 | 3 | 2 |

Example 14: Herbicidal action in ratings 1 – 9 according to the E.W.R.C. scheme.

EXAMPLE 15

Crop plants grown in a greenhouse:

| Triticum vulgare | Wheat |
| Hordeum sativum | Barley |
| Avena sativa | Oats |
| Secale cereale | Rye |
| Zea mays | Maize |
| Oryza sativa | Rice |
| Vicia faba | Horse bean |
| Trifolium pratense | Red clover |
| Beta vulgaris | Sugar beet |
| Raphanus sativus var.radicula | Radish |
| Cucumis sativa | Cucumber | were sprayed with the suspension of the compounds according to the invention, described in Example 14. At the time of treatment, the varieties of cereal, maize and rice had formed 3 leaves and the sugar beets, horse beans, radishes and cucumbers had formed the cotyledon or the primary leaves and the first genuine foliage leaf pair. Red clover was treated after the first trifoliate leaf had developed. The dosage corresponded to 1.4 kg and 5 kg of active substance/hectare. 14 days after the treatment the degree of damage to the crop plants was determined in accordance with the following scheme:

| Rating of damage to the crop plant | Corresponding to % thinning-out or scorching or inhibition of growth |
|---|---|
| 1 | 0 |
| 2 | 2.5 |
| 3 | 5 |
| 4 | 10 |
| 5 | 15 |
| 6 | 25 |
| 7 | 35 |
| 8 | 67.5 |
| 9 | 100 |

As the examples show, the use of 3-phenyl-5-hydroxy-4,6-dichloropyridazine in particular leads to 100% combating success in the case of all the weeds tested, even when using the small amount of 1.4 kg/hectare.

As can be seen from Example 15, a number of crop plants show good to very good tolerance towards the compounds according to the invention. Crop plants from the group of the grasses, in particular, prove to be largely tolerant, so that a use for combating weeds, for example in cereal cultures, is possible.

We claim:

1. A phenylpyridazine having the formula:

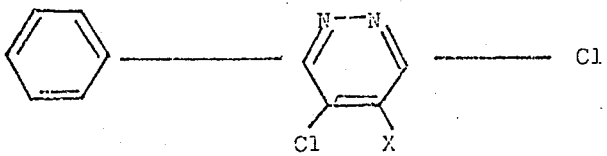

in which
X is selected from the group consisting of

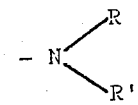

and —O—R", wherein
R and R' which have the same or a different meaning are selected from the group consisting of hydrogen and alkyl having 1, 2 or 3 carbon atoms and
R" selected from the group consisting of hydrogen and alkyl having 1 to 6 carbon atoms.

2. The phenylpyridazine according to claim 1, 3-

Action on crop plants

| Crop plants: | Triticum vulgare | | Hordeum sativum | | Avena sativa | | Secale cereale | | Zea mays | | Vicia faba | | Trifolium pratensis | | Beta vulg. | | Oryza sativa | | Raphanus sat.var.r. | | Cucumis sativa | |
|---|---|---|---|---|---|---|---|---|---|---|---|---|---|---|---|---|---|---|---|---|---|---|
| Active compounds: X in the formula I | 1.4 | 5 | 1.4 | 5 | 1.4 | 5 | 1.4 | 5 | 1.4 | 5 | 1.4 | 5 | 1.4 | 5 | 1.4 | 5 | 1.4 | 5 | 1.4 | 5 | 1.4 | 5 kg/ha |
| $NH_2$ | 1 | 1 | 1 | 1 | 1 | 1 | 1 | 1 | 1 | 3 | 2 | 5 | 2 | 3 | 4 | 6 | 1 | 1 | 4 | 5 | 5 | 7 |
| $NHCH_3$ | 1 | 1 | 1 | 2 | 1 | 2 | 1 | 1 | 2 | 3 | 3 | 5 | 2 | 3 | 4 | 5 | 1 | 1 | 3 | 4 | 6 | 8 |
| $N(CH_3)_2$ | 1 | 2 | 1 | 3 | 1 | 3 | 1 | 2 | 2 | 3 | 3 | 5 | 2 | 3 | 4 | 5 | 1 | 2 | 3 | 5 | 6 | 8 |
| $NHC_2H_5$ | 1 | 1 | 1 | 1 | 1 | 2 | 1 | 1 | 1 | 2 | 4 | 5 | 2 | 3 | 4 | 5 | 1 | 1 | 4 | 5 | 6 | 8 |
| $N(C_2H_5)_2$ | 1 | 1 | 1 | 2 | 1 | 2 | 1 | 2 | 2 | 3 | 4 | 6 | 2 | 3 | 5 | 6 | 1 | 2 | 5 | 7 | 6 | 8 |
| $NH.C_3H_7$—iso | 1 | 2 | 1 | 3 | 1 | 2 | 1 | 2 | 2 | 3 | 2 | 4 | 1 | 2 | 4 | 6 | 1 | 2 | 4 | 6 | 5 | 7 |
| OH | 1 | 1 | 1 | 1 | 1 | 1 | 1 | 1 | 1 | 1 | 2 | 4 | 1 | 2 | 5 | 8 | 1 | 1 | 4 | 8 | 6 | 9 |
| $OCH_3$ | 1 | 1 | 1 | 2 | 1 | 1 | 1 | 1 | 1 | 2 | 2 | 3 | 1 | 2 | 2 | 5 | 1 | 1 | 2 | 5 | 4 | 7 |
| $OC_2H_5$ | 1 | 3 | 1 | 4 | 1 | 3 | 1 | 3 | 2 | 3 | 2 | 5 | 1 | 3 | 2 | 6 | 1 | 2 | 3 | 6 | 6 | 8 |
| $OC_4H_9$—n | 1 | 3 | 1 | 3 | 1 | 2 | 1 | 2 | 2 | 3 | 2 | 5 | 2 | 5 | 2 | 7 | 1 | 1 | 2 | 6 | 7 | 8 |

Example 15: Damage to crop plants, in ratings 1 – 9 according to the E.W.R.C. scheme.

Phenyl-4,6-dichloro-5-aminopyridazine

3. The phenylpyridazine according to claim 1, 3-Phenyl-4,6-dichloro-5-methylaminopyridazine 4. The phenylpyridazine according to claim 1, 3-Phenyl-4,6-dichloro-5-dimethylaminopyridazine 5. The phenylpyridazine according to claim 1, 3-Phenyl-4,6-dichloro-5-ethylaminopyridazine 6. The phenylpyridazine according to claim 1, 3-Phenyl-4,6-dichloro-5-diethylaminopyridazine 7. The phenylpyridazine according to claim 1, 3-Phenyl-4,6-dichloro-5-isopropylaminopyridazine 8. The phenylpyridazine according to claim 1, 3-Phenyl-4,6-dichloro-5-hydroxypyridazine 9. The phenylpyridazine according to claim 1, 3-Phenyl-4,6-dichloro-5-methoxypyridazine 10. The phenylpyridazine according to claim 1, 3-Phenyl-4,6-dichloro-5-ethoxypyridazine 11. The phenylpyridazine according to claim 1, 3-Phenyl-4,6-dichloro-5-n-butoxypyridazine

* * * * *

UNITED STATES PATENT OFFICE
CERTIFICATE OF CORRECTION

Patent No. 3,879,391  Dated  April 22, 1975

Inventor(s) Alfred DISKUS, Rupert SCHONBECK, Engelbert KLOIMSTEIN and Hubert MAYR It is certified that error appears in the above-identified patent and that said Letters Patent are hereby corrected as shown below:

Page one, first column, below the line reading "[21] Appl. No.: 362,505", insert the following:

-- [30]  Foreign Application Priority Data

June 19, 1972 Germany..........P 22 29 744.5 --.

Signed and Sealed this second Day of September 1975

[SEAL]

Attest:

RUTH C. MASON
*Attesting Officer*

C. MARSHALL DANN
*Commissioner of Patents and Trademarks*